United States Patent [19]

Lund et al.

[11] Patent Number: 4,986,930
[45] Date of Patent: Jan. 22, 1991

[54] POLYOL-BLOWING AGENT COMPOSITIONS WITH IMPROVED STORAGE STABILITY

[75] Inventors: Earl A. E. Lund, West Seneca; Robert G. Richard, Cheektowaga; Ian R. Shankland; David P. Wilson, both of Williamsville, all of N.Y.

[73] Assignee: Allied-Signal Inc., Morris Township, Morris County, N.J.

[21] Appl. No.: 251,730

[22] Filed: Oct. 3, 1988

[51] Int. Cl.$^5$ .................................. G08J 9/02
[52] U.S. Cl. .......................... 252/182.24; 521/131
[58] Field of Search ............ 252/182.24, 380, 182.24; 521/131

[56] References Cited

U.S. PATENT DOCUMENTS

| | | | |
|---|---|---|---|
| 3,887,483 | 6/1975 | Morehouse | 252/182.27 |
| 3,966,650 | 6/1976 | Prokai | 521/111 |
| 3,986,062 | 7/1975 | Morehouse | 521/112 |
| 4,003,847 | 1/1977 | Prokai | 252/350 |
| 4,024,088 | 5/1977 | Godlewski | 521/107 |
| 4,076,644 | 2/1978 | Burt et al. | 252/182 |
| 4,271,273 | 6/1981 | Biranowski et al. | 521/110 |
| 4,306,035 | 12/1981 | Baskent et al. | 521/110 |
| 4,699,932 | 10/1987 | Fuzesi et al. | 521/129 |

Primary Examiner—Robert L. Stoll
Assistant Examiner—Valerie Fee
Attorney, Agent, or Firm—J. P. Friedenson; C. D. Szuch

[57] ABSTRACT

Premixes of a polyol suitable for polyurethane or polyisocyanurate foam preparation and 1,1-dichloro-1-fluoroethane require no stabilizer to inhibit reaction between the fluorocarbon and the polyol. These premixes are useful for polyurethane and polyisocyanurate foam preparation.

4 Claims, No Drawings

POLYOL-BLOWING AGENT COMPOSITIONS WITH IMPROVED STORAGE STABILITY

FIELD OF THE INVENTION

This invention relates to improved polyurethane and polyisocyanurate foam systems which eliminate the need for stabilizers used in the past with certain chlorofluorocarbon blowing agents. The improvement stems from the discovery that use of 1,1-dichloro-1-fluoroethane ($CCl_2FCH_3$) as the blowing agent provides enhanced chemical stability when the blowing agent is stored as a pre-mix, i.e. blowing agent pre-blended with certain other components used in polyurethane-type foam manufacture, such as polyols.

BACKGROUND OF THE INVENTION

It is well known to those skilled in the art that polyurethane and polyisocyanurate foams can be prepared by reacting and foaming a mixture of ingredients, consisting in general of an organic polyisocyanate (including diisocyanate) and an appropriate amount of polyol or mixture of polyols in the presence of a volatile liquid blowing agent, which is caused to vaporize by the heat liberated during the reaction of isocyanate and polyol. It is also well known that this reaction and foaming process can be enhanced through use of amine and/or tin catalysts as well as surfactants. The catalysts ensure adequate curing of the foam while the surfactants regulate and control cell size.

In the class of foams known as low density rigid polyurethane or polyisocyanurate foam the blowing agent of choice has been trichlorofluoromethane, $CCl_3F$, also known as CFC-11. These types of foams are closed-cell foams in which the CFC-11 vapor is encapsulated or trapped in the matrix of closed cells. They offer excellent thermal insulation, due in part to the very low thermal conductivity of CFC-11 vapor, and are used widely in insulation applications, e.g. roofing systems, building panels, refrigerators and freezers. Generally, 1-40 and typically, 15-40 parts of blowing agent per 100 parts polyol are used in rigid polyurethane or polyisocyanurate formulations.

Flexible polyurethane foams on the other hand are generally open-cell foams and are manufactured using a diisocyanate and polyol along with catalysts and other additives with various combinations of water, methylene chloride and CFC-11 as the blowing agent. These foams are widely used as cushioning materials in items such as furniture, bedding and automobile seats. The quantity of CFC-11 used as an auxiliary blowing agent in flexible foam manufacture varies from 1-30 parts by weight per 100 parts of polyol according to the grade of foam being prepared.

It is common practice in the urethane foam systems area to prepare so-called pre-mixes of certain components used to prepare the foam, i.e. often the appropriate quantities of polyol, blowing agent, surfactant, catalyst, flame retardant and other additives, are blended together and sold along with the stoichiometric quantity of polyisocyanate component in two separate containers. This is convenient for the end user who then only has to combine the two reactants in order to create a foam. It is also common practice for large foam manufacturing plants to pre-mix the polyol with the blowing agent in bulk storage containers. This liquid mixture possesses a lower viscosity than the pure polyol and is therefore easier to pump and meter into the mixing zone of the foam manufacturing equipment.

Special precautions must be taken when following these practices if the blowing agent is CFC-11, namely, the CFC-11 must have a stabilizer added to it in order to inhibit a reaction which can occur between the fluorocarbon and the polyol resulting in the production of acids such as hydrogen chloride and other organic products such as aldehydes and ketones. These reaction products have a detrimental effect on the reactivity characteristics of the foam ingredients which in the worst case results in no foaming action at all. Stabilizers found useful in stopping the reaction between fluorocarbon and polyol have been disclosed, for example, in U.S. Pat. Nos. 3,183,192 and 3,352,789. Use of such stabilizers with CFC-11/polyol based blends, although successful when measured in terms of fluorocarbon stability, have disadvantages such as added expense and sometimes cause odor problems which persist even in the finished foam.

For the above reasons, it would be advantageous to identify useful fluorocarbon blowing agents which do not require stabilizers in the presence of polyols. Unfortunately, there does not appear to be any reliable scientific basis upon which to predict such stability.

The propensity for a fluorocarbon species to react with an OH containing species, like a polyol, is dependent, in the fundamental sense, on the electronic and molecular structures of the fluorocarbon and the OH species involved. Studies of certain reactant systems, such as CFC-11 and ethanol by P.H. Witjens. *Aerosol Age* Vol. 4. No. 12 (December 1959). P.A. Sanders "Mechanisms of the Reaction Between Trichlorofluoromethane and Ethyl Alcohol", *Proc. of the CSMA* 46th Mid-Year Meeting, (May 1960), and J.M. Church and J.H. Mayer, *J. of Chem. and Eng. Data*, Vol. 6 No. 3 (July 1961), have shown that the reaction products include hydrochloric acid acetaldehyde $CHCl_2F$. Sanders, in *Soap and Chemical Specialties*, (December 1965) has shown that these reactions are further promoted by the presence of metal and water.

H.M. Parmelee and R.C. Downing in *Soap Sanitory Chemicals*, Vol. 26, pp. 114-119 (July 1950) have shown that fluorocarbons such as chlorodifluoromethane (FC-22). 1,1-difluoroethane (FC-152a). 1,1,1-chlorodifluoroethane (FC-142b) and 1,1,2,2-tetrafluoro-1,2-dichloroethane (FC-114) undergo reactions in aqueous and ethanol and isopropanol solutions in the presence of steel and aluminum. Church and Mayer, supra, state that mixed polyhalogenated hydrocarbons containing both chlorine and fluorine on the same carbon atom are less stable than the polyfluoro derivatives.

The molecular structure of FC-141b ($CCl_2FCH_3$) suggests that CFC-141b is amenable to dehydrochlorination due to the presence of hydrogen and chlorine atoms on adjacent carbon atoms. On the other hand CFC-123 ($CHCl_2CF_3$) is amenable to dehydrofluorination, a process requiring a greater activation energy. Therefore it would be expected that CFC-141b would be less stable than CFC-123.

The prior art evidence therefore suggests that chlorine and fluorine substituted hydrocarbons as a class react with organic OH containing species such as alcohols and polyols.

U.S. Pat. No. 4,076,644 discloses that CFC-123 may be used as a blowing agent and does not require a stabilizer in the presence of polyols. Thus. CFC-123 may be an exception to the rule that fluorocarbons require stabilizers.

However, stability tests on CFC-123 in the of a variety of polyols show that CFC-123 may not be stable in the presence of some polyols which are commonly used in the preparation of polyurethane and polyisocyanurate foams.

It is accordingly an object of this invention to identify another fluorocarbon useful as a blowing agent for polyurethane and polyisocyanurate foams which is stable in the presence of polyols.

It is another object of this invention to identify such a fluorocarbon which is also considered to be a stratospherically safe substitute for CFC-11 which is thought to be a contributor to ozone depletion and global greenhouse warming.

Yet another object of the invention is to identify such a fluorocarbon which may have a wider or at least different range of applicability to polyols than does CFC-123.

Other objects and advantages of the invention will be apparent from the following description.

SUMMARY OF THE INVENTION

The objects of the invention have been found to be achieved by using 1,1-dichloro-1-fluoroethane (CFC-141b) as the blowing agent.

Thus, the invention comprises mixtures of a polyol suitable for polyurethane or polyisocyanurate foam preparation and 1,1-dichloro-1-fluoroethane in proportions suitable for polyurethane or polyisocyanurate foam preparation.

DETAILED DESCRIPTION OF THE INVENTION

CFC-141b is a known material and can be prepared by methods known to the art such as disclosed in U.S. Pat. No. 3,833,676.

In accordance with the invention. CFC-141b may be used as described in the background portion of this description to prepare a variety of polyurethane and polyisocyanurate foams by standard techniques known to the art which may include the use of various standard additives such as catalysts, surfactants, water and others.

The amount of CFC-141b relative to the amount of polyol employed will vary depending upon the application, the type of foam being prepared, the identity of the polyol and other factors, but can readily be determined by anyone skilled in the art. Generally, from about 1 to 40 parts by weight of CFC-141b per 100 parts by weight of polyol are employed, but preferably about 15 to 40 parts by weight of CFC-141b per 100 parts by weight of polyol are used in rigid foam manufacture and about 1–30 parts by weight of CFC-141b per 100 parts by weight of polyol are used in flexible foam manufacture.

This invention is further illustrated by the following examples in which parts or percentages are by weight unless otherwise specified.

EXAMPLE 1

In this example the stability of CFC-141b/polyol blends is compared with the stability or similar CFC-11/polyol and CFC-123/polyol blends.

The comparison is performed by measuring the apparent pH of the fluorocarbon/polyol blends which had undergone accelerated aging at 54° C. for a period of 12 weeks. The fluorocarbon/polyol compositions simulate commercial low density foam formulations and are based on 35 parts of CFC-11 per 100 parts polyol. CFC-141b/polyol and CFC-123/polyol blends were prepared taking the difference in fluorocarbon molecular weights into account. A spectrum of polyols, covering a range of acidity, were employed in this test further simulating commercial practice. The mixtures, contained in sealed glass tubes, were placed in an oven controlled at 54 ±0.5° C. for the 12 week period.

The apparent pH of each blend was determined by mixing 20 cm of the fluorocarbon/polyol blend with 80 cm of 0.1 Normal KCl solution made up in 3:1 methanol:water and then measuring the pH of the final solution with a calibrated pH meter. This type of measurement is believed accurate to ±0.1 pH unit.

The results of this test are summarized in Table I which shows that the pH of the blowing agent/polyol blend decreases after aging for 12 weeks at 54° C., indicating a build up of acid species, typical of the chlorofluorocarbon - polyol reaction discussed above The extent of the reaction, as measured by the pH decrease, depends on the type of polyol used and also depends on which blowing agent is involved. The largest pH decrease for all the polyols except for TERATE 203[1] corresponding to the largest acid build-up, occurs with CFC-11. The smallest acidity increase for the most number of polyols (four out of six) occurs with CFC-141b indicating that this blowing agent is the most stable with most of the polyols tested.

[1]Aromatic polyester polyol obtained from Hercules Inc.

TABLE I

POLYOL/BLOWING AGENT APPARENT PH STORED AT 54° C. FOR 12 WEEKS

| Polyol | Apparent pH | | | |
|---|---|---|---|---|
| | Polyol pH | CFC-11 Polyol | CFC-123/ Polyol | CFC-141b/ Polyol |
| VORANOL 800[a] | 11.8 | 8.5 | 10.1 | 11.1 |
| THANOL 650X[b] | 10.1 | 8.7 | 9.6 | 9.9 |
| PLURACOL 1114[c] | 8.5 | 8.0 | 7.9 | 8.2 |
| POLY G 75-442[d] | 6.1 | 3.7 | 3.5 | 4.0 |
| Terate ® 203[e] | 4.8 | 4.8 | 4.8 | 4.6 |
| FOAMOL 3500[f] | 4.0 | 3.6 | 4.0 | 3.9 |

[a]Amine - based polyether polyol obtained from Dow Chemical
[b]Rigid Polyol obtained from Texaco Inc.
[c]Polyether polyol/polyester polyol blend obtained from BASF Wyandotte Corp.
[d]Methyl glucoside - based polyol blend obtained from Olin
[e]from Hercules Inc
[f]from Jim Walter Research

EXAMPLE 2

This example further confirms the enhanced stability of CFC-141b/polyol blends over CFC-11/polyol blends and, for most of the polyols tested, over CFC-123/polyol blends using a different measure of the acidity change and using a more real-life storage technique.

Poly/blowing agent blends were prepared at a 30 weight percent blowing agent composition and stored in closed, unlined tin-plated steel cans for 10 weeks at 54° C. At the end of the aging period a sample of the mixture is diluted with ethanol and titrated against a standard solution of KOH in ethanol to a pH=9.5 endpoint. The increase in acidity is denoted as the change in acid number of the mixture, $\Delta$(acid #), which represents the additional amount of KOH required to neutralize the mixture over what is required to neutralize the un-aged polyol. The changes in acid number are measured in mg KOH/g polyol and are listed in Table II.

TABLE II

BLOWING AGENT/POLYOL ACID NUMBER DATA MIXTURES STORED AT 54° C. FOR 10 WEEKS

| Polyol | CFC-11/Polyol Δ(acid #)* | CFC-123 Polyol Δ(acid #)* | CFC-141b/Polyol Δ(acid #)* |
| --- | --- | --- | --- |
| Thanol ® 650X | 6.49 | 0.79 | 0.0 |
| Pluracol ® 1114 | 1.21 | 0.70 | 0.25 |
| Poly G ® 75-442 | 122.7 | 0.10 | 0.45 |
| Terate ® 203 | 8.95 | 8.60 | 3.80 |
| Foamol ® 3500 | 11.1 | 2.1 | 3.1 |
| Mean Value | 30.1 | 2.5 | 1.5 |

*Additional mf KOH/g polyol required to neutralize the mixture

This test shows that CFC-141b results in substantially smaller acid generation in all cases relative to CFC-11 indicating its stability in the presence of polyols.

The Thanol 650X polyol listed in Table II is the current commercial equivalent of Thanol 350X which is used in Example 4 of U.S. Pat. No. 4,076,644. It is stated in that patent that use of CFC-123 with this particular polyol rather than CFC-11 results in less acid increase. which is also evident in the present example. The present example also shows, however, that use of CFC-141b with this particular polyol results in essentially no acid generation and also that CFC-141b results in less acid increase in three out of the five polyols tested compared with CFC-123. Table II also includes the mean value of the acid number increase for all of the polyols tested. The average value for CFC-141b is less than that for CFC-123 and significantly less than that for the currently used blowing agent CFC-11. The superior stability of CFC-141b over CFC-123 is particularly surprising in view of the anticipated lower stability of CFC-141b compared with CFC-123 for the reasons given above. The comparative results of CFC-141b versus CFC-123 with Thanol 650X are surprising and unexpected in view of their magnitude. The data from Table II as well as Table I also suggest that CFC-141b may be stable with a greater range of polyols than CFC-123.

The data in Tables I and II indicate that CFC-123 is not significantly more stable than CFC-11 in the presence of Terate ® 203, but that (see Table II) CFC-141b is significantly more stable than both CFC-123 and CFC-11 in the presence of Terate ® 203.

The above discussed data show that CFC-141b is more stable with a number of polyols tested compared with CFC-123 and that in at least one case CFC-141b is stable with a polyol with which CFC-123 is not stable (as measured by no improvement over CFC-11).

What is claimed is:

1. Premixes comprising a polyol suitable for polyurethane or polyisocyanurate foam preparation and 1.1-dichloro-1-fluoroethane in proportions suitable for polyurethane or polyisocyanurate foam preparation.

2. Premixes according to claim 1 containing about 1 to about 40 parts by weight per 100 parts by weight polyol of 1,1-dichloro-1-fluoroethane.

3. Mixtures consisting essentially of a polyol suitable for polyurethane or polyisocyanurate foam preparation and 1,1-dichloro-1-fluoroethane in proportions suitable for polyurethane or polyisocyanurate foam preparation.

4. Mixtures according to claim 3 consisting essentially of about 1 to about 40 parts by weight per 100 parts by weight polyol of 1,1-dichloro-1-fluoroethane.

* * * * *